United States Patent
Wagner et al.

(10) Patent No.: US 10,464,266 B2
(45) Date of Patent: Nov. 5, 2019

(54) METHOD AND DEVICE FOR PRODUCING A FIBER COMPOSITE COMPONENT AND FIBER COMPOSITE COMPONENT

(71) Applicant: Bayerische Motoren Werke Aktiengesellschaft, Munich (DE)

(72) Inventors: Peter Wagner, Munich (DE); Gerhard Greim, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 721 days.

(21) Appl. No.: 14/873,461

(22) Filed: Oct. 2, 2015

(65) Prior Publication Data

US 2016/0023405 A1    Jan. 28, 2016

Related U.S. Application Data

(63) Continuation of application No. PCT/EP2014/059513, filed on May 9, 2014.

(30) Foreign Application Priority Data

Jun. 12, 2013   (DE) .................. 10 2013 210 934

(51) Int. Cl.
*B29C 70/08*     (2006.01)
*B29B 11/16*     (2006.01)
(Continued)

(52) U.S. Cl.
CPC ............ *B29C 70/081* (2013.01); *B29B 11/16* (2013.01); *B29C 70/30* (2013.01); *B29C 70/305* (2013.01);
(Continued)

(58) Field of Classification Search
CPC ...... B29C 70/081; B29C 70/30; B29C 70/305; B29C 70/08; B29C 70/12; B29K 2105/12;
(Continued)

(56) References Cited

U.S. PATENT DOCUMENTS 3,449,199 A    6/1969  Mead
3,984,898 A  * 10/1976  Matsumura .............. D04H 1/72
                                                                425/81.1
(Continued)

FOREIGN PATENT DOCUMENTS

CN        101386218 A      3/2009
DE        31 37 844 A1     4/1983
(Continued)

OTHER PUBLICATIONS

L. Liu et al., "Mechanical Performance of Laminated Composites Incorporated with Nanofibrous Membranes," Materials Science and Engineering, A435-436 (2006), pp. 309-317; XP027952956.

(Continued)

*Primary Examiner* — Camie S Thompson
(74) *Attorney, Agent, or Firm* — Crowell & Moring LLP

(57) ABSTRACT

A method and a device are provided for producing a fiber composite component. The method includes preparing a long-fiber layer; applying short fibers to the long-fiber layer; and applying a further long-fiber layer to the long-fiber layer provided with the short fibers. The device is configured to carry out the method. The fiber composite component has a layer arrangement composed of at least two long-fiber layers, wherein the layer arrangement has an addition of short fibers. The short fibers are configured and dimensioned and are applied in such a way or are in such an arrangement that propagation of tears in one of the long-fiber layers into in each case the other or an adjacent one of the long-fiber (Continued)

layers and/or delamination between the long-fiber layers is rendered more difficult.

12 Claims, 3 Drawing Sheets

(51) Int. Cl.

| | |
|---|---|
| *B29C 70/30* | (2006.01) |
| *B32B 5/02* | (2006.01) |
| *B32B 5/12* | (2006.01) |
| *B32B 5/26* | (2006.01) |
| *B29K 63/00* | (2006.01) |
| *B29K 105/08* | (2006.01) |
| *B29K 105/12* | (2006.01) |
| *B29K 307/04* | (2006.01) |

(52) U.S. Cl.
CPC ............... *B32B 5/022* (2013.01); *B32B 5/12* (2013.01); *B32B 5/26* (2013.01); *B29K 2063/00* (2013.01); *B29K 2105/0872* (2013.01); *B29K 2105/12* (2013.01); *B29K 2307/04* (2013.01); *B32B 2262/106* (2013.01)

(58) Field of Classification Search
CPC ........ B29K 2307/04; B29K 2105/0872; B32B 5/12; B32B 5/26; B32B 2262/106; B32B 5/08; B32B 5/28; B32B 5/02; B32B 5/022; D04H 3/04; D04H 13/00; D04H 1/22; D04H 1/72; D21H 15/06; D21H 27/30; B29B 11/16
USPC ..... 156/245, 256, 272, 552, 276; 428/292.1; 425/82.1
See application file for complete search history.

(56) References Cited

U.S. PATENT DOCUMENTS

| | | | |
|---|---|---|---|
| 5,248,551 A | 9/1993 | Kelman et al. | |
| 5,766,745 A * | 6/1998 | Smith ..................... | B32B 5/26 428/218 |
| 6,156,682 A | 12/2000 | Fletemier et al. | |
| 6,995,099 B1 * | 2/2006 | Nishimura ............ | B29C 70/083 442/59 |
| 2003/0017053 A1 | 1/2003 | Baldwin et al. | |

FOREIGN PATENT DOCUMENTS

| | | |
|---|---|---|
| DE | 10 2011 119 856 A1 | 5/2013 |
| EP | 0 426 317 A2 | 5/1991 |
| EP | 1 125 728 A1 | 8/2001 |
| EP | 2 246 180 A2 | 3/2010 |
| JP | 2010-209501 * | 9/2010 |
| WO | WO 99/62705 A1 | 12/1999 |

OTHER PUBLICATIONS

I. Taketa et al., "Strength Improvement in Unidirectional Arrayed Chopped Strands with Interlaminar Toughening," Composites: Part A 40 (2009) pp. 1174-1178; XP026470555.
International Search Report (PCT/ISA/210) issued in PCT Application No. PCT/EP2014/059513 dated Jul. 17, 2014 with English-language translation (six (6) pages).
German Search Report issued in counterpart German Application No. DE 10 2013 210 934.2 dated Jan. 24, 2014 with partial English-language translation (eleven (11) pages).
Chinese Office Action issued in counterpart Chinese Application No. 201480021333.0 dated Jun. 1, 2016, with English translation (seventeen (17) pages).

* cited by examiner

State of the Art:

METHOD AND DEVICE FOR PRODUCING A FIBER COMPOSITE COMPONENT AND FIBER COMPOSITE COMPONENT

CROSS REFERENCE TO RELATED APPLICATIONS

This application is a continuation of PCT International Application No. PCT/EP2014/059513, filed May 9, 2014, which claims priority under 35 U.S.C. § 119 from German Patent Application No. 10 2013 210 934.2, filed Jun. 12, 2013, the entire disclosures of which are herein expressly incorporated by reference.

BACKGROUND AND SUMMARY OF THE INVENTION

The present invention relates to a method and to a device for producing a fiber composite component as well as to a fiber composite component.

It is known to produce fiber composite components from two or more layers of unidirectional or multi-directional long fiber arrangements, which hereafter in the present application are referred to as long fiber layers, wherein the long fiber layers are arranged crosswise or with arbitrary angular offset. In other words, multiple long fiber layers, in particular unidirectional (UD) layers, are stacked on top of each other with different orientations of the fibers, so as to prepare a preform or a prepreg, which is subsequently pressed into shape, wetted with a matrix (such as thermosetting or thermoplastic resins), impregnated and cured. An exemplary method for producing a fiber composite component made of at least two long fiber layers according to the prior art is schematically shown in FIG. 6.

According to the illustration in FIG. 6, initially a stack of long fiber layers 32, each having a defined fiber orientation, is prepared in a laminating station 31. The long fiber layers 32 are prepared from rovings (fiber strands made of quasi-continuous individual filaments), for example. In a preforming process 33, the long fiber layers 32 are then formed to obtain a preform 34. In an insertion step 35, the preform 34 is inserted into a mold 36 having a lower part 37 and an upper part 38, each having shaping surfaces that correspond to the shape of the component to be produced. The inserted preform is positioned for this purpose via the mold contour. If positioning via the mold contour is not possible, spring-loaded positioning pins (not shown) are used on the mold 36, for example. The preform is punched out, for example, and then positioned with the punched holes over the pins. The spring-loaded pins are later pushed by the upper part 38 into the lower part 37 when the mold is being closed. In a pressing process 39, the preform 34 is then pressed in the mold 36. This is done by what is known as an index closing process, for example. Initially, a gap of approximately 0.3 mm is set, which is to say the cavity between the upper part 37 and lower part 38 is closed, leaving an oversize of approximately 0.3 mm. The mold is then evacuated by way of venting elements and a vacuum of approximately −0.8 bar. This is intended to prevent air pockets and thus to decisively influence the quality of the RTM component. The venting time varies depending on the mold size and shape. A resin system 41 is then pressed in via an injector 40, said system saturating the preform 34 and forming a bond with the long fiber layers 32. The resin system can be a two-component epoxy resin (2K-EP) system, for example. The injector comprises a mixing head, for example, which is attached to the mold gate point. The individual components are atomized at approximately 110 bar in the mixing head. During injection over a shot time of up to 60 seconds, the internal pressure in the mold can rise to more than 80 bar. After injection has ended, the mold 36 is closed completely, which is to say the gap is reduced from approximately 0.3 mm to zero. Known as gap injection, this process allows the pressure during injection to be lowered, the component surface to be improved, and shrink marks and pores on the finished RTM component to be reduced. The curing time begins after the shot has ended. This time varies as a function of the resin system and mold temperature (approximately 100° C. with base resin, 125° C. with potential resin), and on average is 3 to 6 minutes. The temperature is controlled by way of heating circuits in the mold and related temperature control devices. After the curing time has passed, the finished component 43 is removed from the mold 36 in a demolding process 42. This means that the mold 36 opens automatically, and the ejector pins are actuated. The finished, cured component 43 is thus ejected from the lower part 37. After demolding, the component 43 can be removed either manually or automatically. The mold 36 is then cleaned by way of compressed air.

The above-described process is referred to as a resin transfer molding (RTM) process, for example. Due to the short curing time of an adhesive used in the resin system, this method can result in certain material characteristics, such as pores or the like. During use of the finished component 43, these may create stress peaks and form the starting points for cracks. If a crack forms within a roving, which is to say the reinforcement fiber arrangement, the crack may be stopped by the fibers. In the matrix, however, a crack may propagate freely in some circumstances. This may result in structural failure of the component, for example in the form of delamination.

Similar problems can also occur with liquid press methods, in which the long fiber layers 32 are impregnated with a fiber matrix already prior to shaping so as to form what is known as a prepreg, and the prepreg is pressed directly into shape, optionally without a preforming process 33 and/or pressing of the resin system 41 into the mold.

According to another known method used to produce pressure vessels comprising an Al liner and CFRP winding (wet winding), the finished pressure vessel is subjected to an autofrettage process to increase the service life of the liner. In the autofrettage process, the pressure vessel provided with the liner is subjected to overpressure exceeding the operating overpressure and the yield point of the liner, which causes the liner material to become reinforced due to the resulting (partial) plasticization of the liner and the subsequent reduction of inherent compressive stresses when the pressure is relieved. However, a plurality of microcracks may develop in the matrix, which can reduce the bursting strength.

Components made of multi-layer fiber composite material in general tend to fail due to delamination under load because cracks can propagate freely between the (unidirectional) layers (along what are known as pure resin regions). To ensure reliability, the components are therefore conventionally dimensioned with a large safety factor, whereby an inherent lightweight potential cannot be fully met.

It is an object of the present invention to create a method and a device for producing a fiber composite component as well as a fiber composite component, which avoid the disadvantages of the prior art. It is in particular an object of the present invention to make it possible to increase the service life of CFRP structures, or of fiber composite structures in general, at a lower component weight. It is another object to achieve a reduction in delamination in the case of excessive loading of a fiber composite component. Yet another object of the invention is to achieve an increase in the fracture strength of fiber composite components, for example with respect to impact-related damage. A further object of the invention is to create a possibility to use recycled material in the production of fiber composite components, and thereby enable lower material costs. Finally, it is an object of the invention to allow a reduction in the material expenditure, and thereby greater utilization of the lightweight construction potential of fiber composite structures, in particular CFRP structures.

The above-mentioned object(s) is/are achieved at least in partial aspects by a method according to embodiments of the invention, by a device according to embodiments of the invention, and by a fiber composite component according to embodiments of the invention. Features and details that are described in connection with the method according to the invention also apply in connection with the device according to the invention and the fiber composite component according to the invention, and in each case conversely and reciprocally, so that mutual reference is made, or can be made, in each case to the individual aspects of the invention with respect to the disclosure.

The invention is based on the consideration that a crack bridge made of a thin layer of short fibers, which is applied between two long fiber layers, is able to prevent the linear growth of a crack in the matrix because the crack is forced to take an energy-intensive detour, and additionally must pull the fiber out of the matrix. This results in an increase in the energy that is needed for the crack to grow (larger generated crack surface), crack propagation is slowed, and as a result the service life and static strength are increased.

According to a first aspect of the present invention, analogously a method for producing a fiber composite component made of at least two long fiber layers is provided, wherein the method comprises the following acts:
 a) providing a long fiber layer;
 b) applying short fibers to the long fiber layer; and
 c) applying a further long fiber layer to the long fiber layer provided with the short fibers.

The short fibers are preferably designed and dimensioned in such a way, and are applied such that a propagation of cracks in one of the long fiber layers into the respective other of the long fiber layers and/or delamination between the long fiber layers is made more difficult. Short fibers shall be understood to mean, in particular, fibers having a length that is small in relation to a length of long fibers of the long fiber layers. Ideally, the short fibers have a length of at least 0.5 mm, and the length thereof is limited to a maximum of 30 mm, preferably to a maximum of 10 mm, and in particular to a maximum of 3 mm. The majority of the short fibers that are applied is preferably in the indicated size range. Depending on the type of production of the short fibers, as is described hereafter in more detail, it is possible for individual short fibers to exceed the indicated length range; however, this does not cause any harm as long as a sufficient portion of the short fibers is within the indicated length range. In the broader sense, the term 'short fibers' comprises any elongate structure, such as very short fibers in the micrometer range, or also nanotubes or cut nanotubes, provided they exhibit the effect described above. Depending on the arrangement and fill level of the long fibers in the long fiber layers, it is possible to achieve optimal spreading in the indicated size ranges in such a way that the short fibers slow down cracking without acting as notches, so that it is possible to optimize the added weight resulting from the short fibers in relation to the increase in strength that is achieved. Further method steps, such as impregnation, preforming, pressing, curing and demolding, correspond to the method steps of known methods.

The use of the method according to the invention is not limited to two long fiber layers, but can be expanded to any arbitrary number of long fiber layers, comprising in each case an interposed layer of short fibers, if the above-described steps b) and c) are alternately carried out multiple times. It goes without saying that, when step b) is repeated, the further long fiber layer applied in a step c) is the long fiber layer mentioned there, to which then further short fibers are applied.

Particularly good interlocking of the long fiber layers can be achieved when the short fibers are applied in the above-described step b) in such a fashion that the short fibers at least partially penetrate into the long fiber layer, and wherein the further long fiber layer in step c) is applied in such a fashion that the short fibers at least partially penetrate into the further long fiber layer. In this way a separation of the long fiber layers can be effectively prevented. If steps b) and c) are carried out repeatedly, it goes again without saying that the long fiber layer, when step b) is carried out for the first time, is the long fiber layer provided in step a); however, it is the further long fiber layer that has been applied during a prior instance of carrying out step c) if step b) is carried out again.

In a preferred refinement of the method according to the invention, the short fibers are applied in step b) in such a fashion that the short fibers have at least one substantially random orientation. This may mean in particular that the short fibers are applied in a deliberately randomized manner. Due to the randomized orientation, no preferred crack propagation direction is able to develop. In other words, the crack must always look for a new path, which further increases the energy necessary for the crack to grow, and thus further slows crack propagation and further increases the service life and static strength of the component.

In a preferred embodiment of the method according to the invention, the short fibers are produced by cutting a fiber strand to size and/or by processing, in particular comminuting, preferably grinding or shredding, recycled material, in particular production scrap. A fiber strand shall be understood in particular to mean what is known as a roving, which can be continuously fed in the method. The use of a fiber strand has advantages with respect to storage and handling, in particular feeding, and the short fibers can in particular be produced directly and continuously prior to use. The use of a recyclate, which can also be combined with the use of fiber strands, may make it possible to reuse scrap materials. This allows raw materials to be saved and process optimization to be achieved, and optionally statutory requirements to be met. Statutory requirements may relate to the mandatory compliance with a certain recycled portion when using plastic materials, for example. This may also relate in particular to the appliance and vehicle industry, which may be obligated to accept old product returns. The method according to the invention may therefore also make a contribution to the reuse of accepted returned products and to a reduction in the amount of waste.

In an alternatively preferred embodiment of the method according to the invention, the short fibers are sprayed on, preferably together with a binder. In this way, applying and impregnating the short fibers can be combined in a single method step. Alternatively, the short fibers can also be sprinkled on.

In a further preferred embodiment alternative, the short fibers are applied as a textile sheet (for example, non-woven fabric or laid scrim) to the long fiber layer. This enables particularly simple feeding and application, which can also speed up the production cycle. It is furthermore possible to cut a non-woven fabric or laid scrim to size in advance, which can further speed up the production of the fiber composite component.

Even though some embodiments above were mentioned as alternatives, the idea of the invention also covers the optional combination of these embodiments.

In a preferred embodiment of the method according to the invention, the short fibers are impregnated with a binder prior to being applied. The impregnation can also take place at least partially while the short fibers are being applied, which can be carried out by way of spraying, for example. If textile semi-finished products and rovings are used, the impregnation can also be carried out after the individual filaments of the roving have been spread, for example. Impregnating the short fibers can prevent adhesion of the long fiber layers in the semi-finished fiber product (the preform), which can further facilitate handling.

Even though the long fiber layers can generally also be provided as a dry semi-finished product, it is also possible in one preferred refinement of the method according to the invention to impregnate the long fiber layers with a binder. A preform can thus be produced, which due to the action of the binder has dimensional stability for further processing steps. Preferably after all long fiber layers have been applied, a layer stack, which is formed by the long fiber layers comprising interposed short fibers in each case, can be pressed in a mold.

Matching the material to the long fiber layers and the matrix, or a potentially present fiber size, is particularly advantageous if the short fibers are made of the same material as the long fiber layers. This may also result in synergies in the process control (impregnation, matrix, and the like) of long fibers and short fibers.

The method is particularly suited for components made of carbon-reinforced plastic material. This means that, in one preferred refinement of the method according to the invention, the short fibers and/or the long fiber layers are produced at least substantially of carbon. However, other fiber/matrix combinations as well as fiber ceramics can also be advantageously influenced by the method according to the invention.

The method exhibits the advantages thereof in particular when the long fiber layers are unidirectional long fiber layers. The problem of delamination and crack propagation is particularly virulent in fiber composite components made of UD fiber layers. However, the method can generally also be employed when using MD layers, and such a use is covered by the invention.

In a further aspect, the invention also relates to a device for producing a fiber composite component made of at least two long fiber layers, wherein said device is designed to carry out the above-described method.

According to a further aspect of the present invention, a fiber composite component having a layer arrangement made of at least two long fiber layers is provided, in which the layer arrangement comprises an admixture of short fibers made in particular of the same material as the long fibers, wherein the short fibers are preferably provided in each case in a transition region between two long fiber layers and are preferably designed, dimensioned and arranged in such a way that a propagation of cracks in one of the long fiber layers into a respective adjacent long fiber layer is made more difficult. A component within the meaning of the invention shall be understood to mean both a finished component and an intermediate product or a semi-finished product. The fiber composite component in particular comprises UD layers, which are preferably made of long carbon fibers. The fiber composite component designed according to this aspect has the advantages and effects described above with respect to the method according to the invention.

In a preferred refinement of the fiber composite component according to the invention, the short fibers penetrate at least partially into one or both of two adjacent long fiber layers. In a further refinement of the fiber composite component according to the invention, the short fibers have an at least substantially random orientation.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
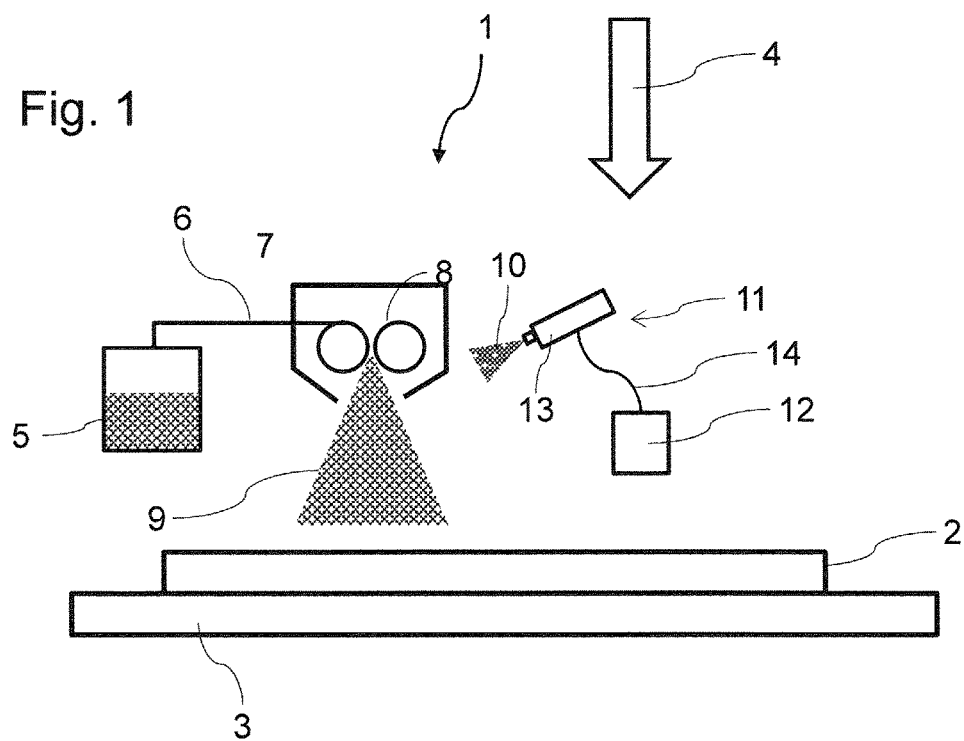
FIG. 1 shows a device for producing a fiber composite component and method steps carried out therewith as respective exemplary embodiments of the present invention.

It goes without saying that the illustrations in the drawings shall be understood to be purely schematic and no limitations with respect to specific dimensions or proportions shall be inferred therefrom, unless these are expressly described hereafter.

Exemplary embodiments of the invention will be described hereafter based on the accompanying drawings. Identical components in multiple figures are denoted in each case by the same reference numerals. Elements, features, purposes and effects that are described with respect to one exemplary embodiment shall be assumed to be usable in any other exemplary embodiment, unless expressly or obviously excluded, and shall also be considered as being disclosed with respect to the respective other exemplary embodiment, even if they are not expressly shown and/or described there.

FIG. 1 shows a schematic illustration of a device 1 for producing a fiber composite component as a first exemplary embodiment of the present invention. FIG. 1 also schematically shows the method acts of a method carried out using the device 1, which is a further exemplary embodiment of the present invention.

The illustration in FIG. 1 shows the device 1 in a state in which a long fiber layer 2 is arranged on a substrate 3. An arrow 4 symbolizes a handling and application device for further long fiber layers 2. A roving repository 5 contains a roving (which is to say a fiber strand) 6, which is fed by way of a short fiber charging device 7, which are not shown in greater detail. The short fiber charging device 7 includes a chipping mechanism 8 through which the roving 6 is guided. The roving 6 or the individual filaments thereof, which can be spread by the means provided upstream of the short fiber charging device 7, which are not shown in detail, are cut in the chipping mechanism 8 into short fibers 9 having a predetermined length. The short fibers 9 drop freely from the short fiber charging device 7 onto the long fiber layer 2. For this purpose, the short fiber charging device 7 can be displaceable across the surface of the long fiber layer 2, or the short fibers 2 are distributed, for example blown, across the long fiber layer 2 by a device that is not shown in detail.

The short fibers 9 are provided with a binder 10 as they are being applied to the long fiber layer 2. The binder 10 is sprayed by a spraying device 11 into the flow of the short fibers 9. More precisely, the binder 10 is fed from a binder tank 12 via a pipe 14 to a nozzle 13 that sprays the binder 10.

The short fibers 9 are cut in the chipping mechanism 8 to a length of 3 mm, for example. However, this value can be adapted to the requirements of the matrix system, the arrangement of the long fibers in the long fiber layer 2, and other process and layout conditions. A length range in the order of 3 mm to 10 mm, optionally also of up to 30 mm, has proven to be practicable and advantageous.

According to the above-described method, a further long fiber layer (2, not shown in detail in the figure) is applied to, and optionally pressed onto, the long fiber layer 2 provided with the short fibers 9 by way of the handling and application device 4. The application of the short fibers 9 and the application of further long fiber layers 2 can be alternately repeated any arbitrary number of times until a desired stack thickness is achieved. Thereafter, method acts that are known per se, such as preforming, pressing, impregnating or injecting a resin system, curing and demolding by means not shown in greater detail, are carried out to finish the component.

Figure 2:
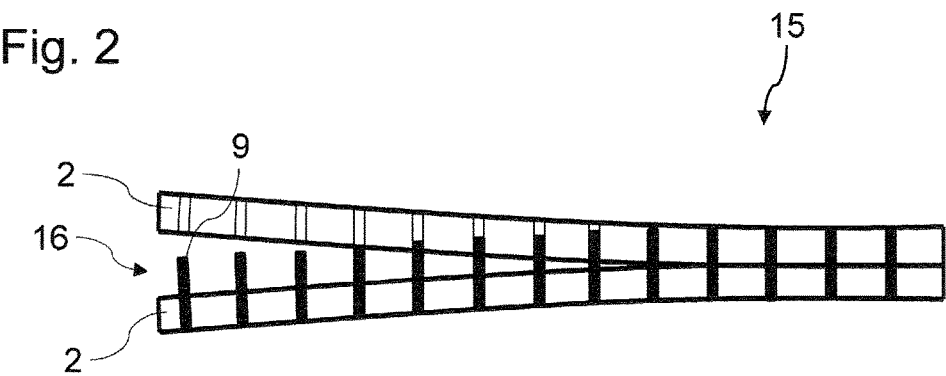
FIG. 2 shows a layer arrangement of a fiber composite component as a further exemplary embodiment of the present invention.

FIG. 2 shows a schematic illustration of a layer arrangement 15, which can be produced by the above-described method and forms a further exemplary embodiment of the present invention. Without limiting the general nature, the layer arrangement 15 comprises two long fiber layers 2. An admixture (or intermediate layer) 16 made of short fibers 9 is provided between the long fiber layers 2, with said short fibers penetrating both into the upper long fiber layer 2 and into the lower long fiber layer 2. In the illustrated situation, the long fiber layers 2 are spread apart on the left end in the figure, and the short fibers 9 of the intermediate layer 16 are partially pulled out of the upper long fiber layer 2. In other words, FIG. 2 schematically shows an incipient delamination process. As is apparent from FIG. 2, the short fibers 9 still remaining in the long fiber layers 2 form a crack bridge, which makes further progression of the delamination more difficult.

Figure 3:
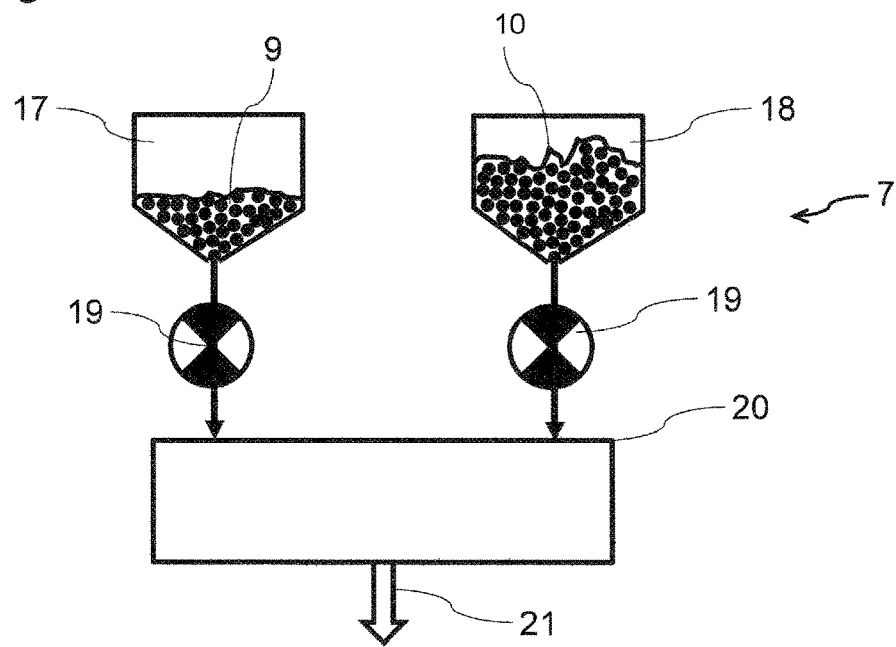
FIG. 3 shows a short fiber charging device in one embodiment variant of the exemplary embodiment shown in FIG. 1.

FIG. 3 shows a schematic illustration of a short fiber charging device 7, which can be used in the device 1 instead of the short fiber charging device 7 shown in FIG. 1. The short fiber charging device 7 according to FIG. 3 includes a short fiber container 17 and a binder container 18. The short fiber container 17 contains a supply of short fibers 9, while the binder container 18 contains a supply of a binder 10, which in this embodiment variant is present as granules. The short fiber charging device 7 furthermore includes two conveyors 19, which feed short fibers 9 from the short fiber container 17 and binder granules 10 from the binder container 18 according to a rule from a control engineering unit, which is not shown in greater detail, to a grinding gear 20.

The grinding gear 20 grinds and mixes the granules of the binder 10 with the short fibers 9 and supplies a short fiber material 21, which can be applied to the long fiber layer—not shown in detail here—as a material flow.

Figure 4:
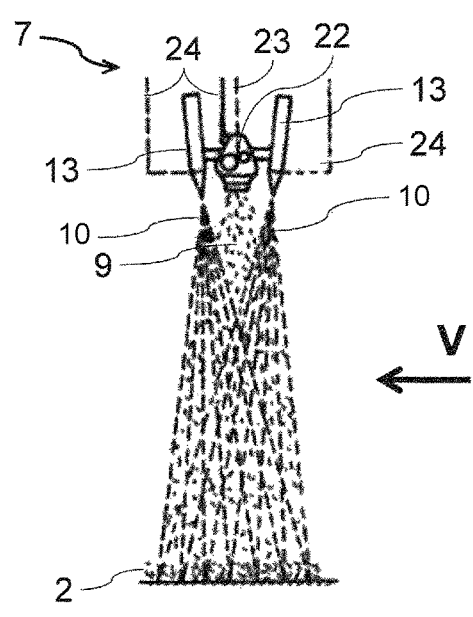
FIG. 4 shows a short fiber charging device in a further embodiment variant.
Figure 5:
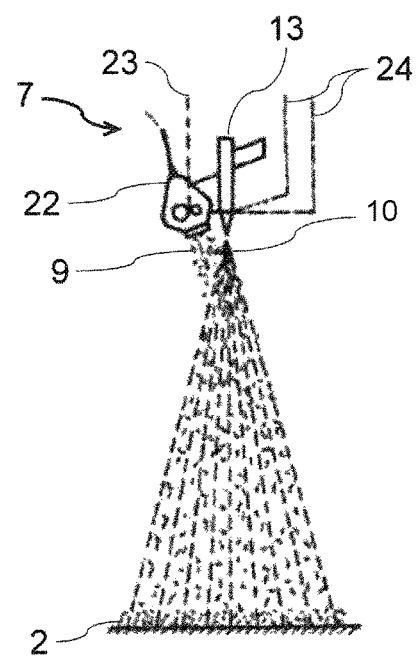
FIG. 5 shows a different view of the short fiber charging device from FIG. 4.
Figure 6:
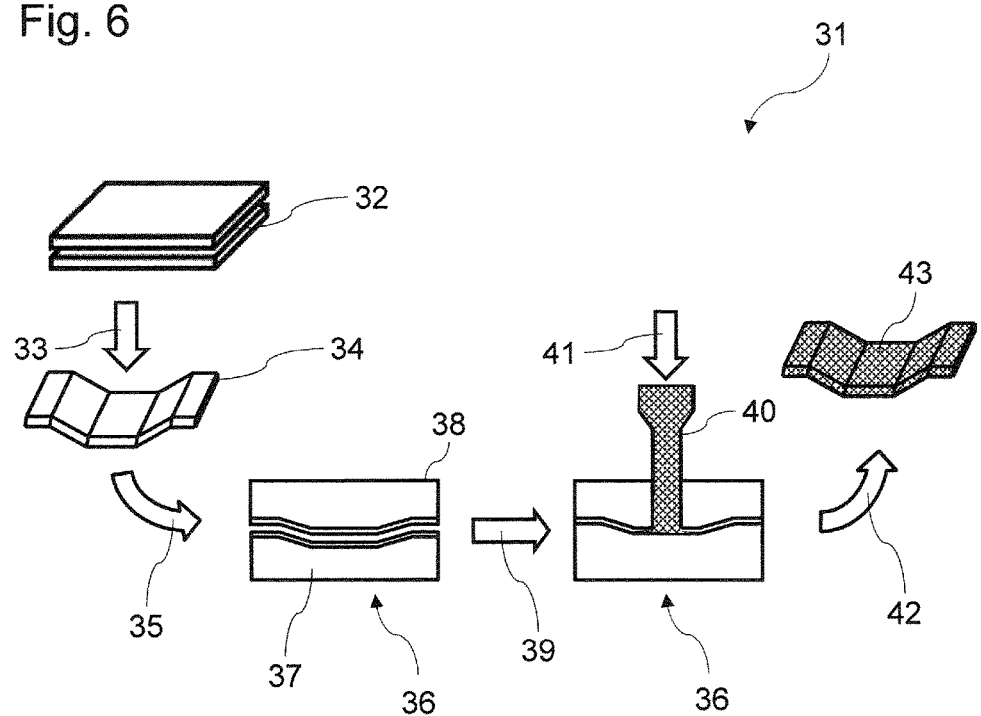
FIG. 6 shows a laminating station as a device for producing a fiber composite component and method steps carried out therewith according to the prior art.

FIG. 4 shows a further short fiber charging device 7 as one embodiment variant of the short fiber charging device 7 shown in FIG. 1 of the device 1 for producing a fiber composite component. FIG. 5 shows the short fiber charging device 7 shown in FIG. 4 from the direction of an arrow V in FIG. 4. In this embodiment, the short fiber charging device 7 includes a fiber spraying unit 22 as well as two nozzles 13. The fiber spraying unit 22 is supplied with short fibers 9 via a fiber feed element 23 as well as with compressed air via a compressed air pipe 24. The short fibers 9 fed via the fiber feed element 23 are blown out by way of the compressed air that is fed via the compressed air pipe 24. The nozzles 13 receive a binder 10 via a feed pipe, which is not shown in detail, and are supplied with compressed air via further compressed air pipes 24. The nozzles 13 are directed into the flow of short fibers 9 and spray the binder 10 into the flow of short fibers 9 by use of the fed compressed air, said flow being delivered by the fiber spraying unit 22. The binder 10 mixes with the flow of the short fibers 9, and the mixture of short fibers 9 and binder 10 therefore impinges on the long fiber layer 2. The fiber spraying unit 22 and the nozzles 13 are guided, for example by an industrial robot, which is not shown in detail, and the fiber material is applied in this way to the semi-finished product.

The invention was described above based on preferred exemplary embodiments, variants, alternatives and modifications and illustrated in the figures. These descriptions and illustrations are purely schematic and do not limit the scope of protection of the claims, but are only provided to illustrate the same by way of example. It goes without saying that the invention can be carried out and modified in a variety of ways, without departing from the scope of protection of the claims.

LIST OF REFERENCE NUMERALS 1 device
2 long fiber layer
3 substrate
4 handling and application device
5 roving repository
6 roving
7 short fiber charging device
8 chipping mechanism
9 short fibers
10 binder
11 spraying device
12 binder tank
13 nozzle
14 pipe
15 layer arrangement
16 transition region (intermediate layer)
17 short fiber container
18 binder container
19 conveyor
20 grinding gear
21 short fiber material
22 fiber spraying unit
23 fiber feed element
24 compressed air pipe
31 laminating station
33 long fiber layers
33 preforming 34 preform
36 inserting
36 mold
37 lower part
38 upper part
39 pressing
40 injector
41 resin system
42 demolding
43 component The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a fiber composite component from at least two long fiber layers, wherein the method comprises the acts of:
    a) providing a long fiber layer;
    b) discharging short fibers from a device to apply the short fibers to the long fiber layer such that the short fibers at least partially penetrate into the long fiber layer; and
    c) applying a further long fiber layer to the long fiber layer provided with the short fibers,
    wherein the short fibers are designed and dimensioned such that, and are applied in such a manner that, a propagation of cracks in one of the long fiber layers into the respective other of the long fiber layers and/or a delamination between the long fiber layers is rendered more difficult,
    wherein the short fibers are sprayed on the long fiber layer, and
    wherein the short fibers are sprayed with a binder after being discharged from the device.

2. The method according to claim 1, wherein the further long fiber layer in act c) is applied such that the short fibers at least partially penetrate into the further long fiber layer.

3. The method according to claim 1, wherein the short fibers in act b) are discharged so that the short fibers have a random orientation.

4. The method according to claim 1, wherein the short fibers are produced by cutting a fiber strand to size.

5. The method according to claim 1, wherein the short fibers are produced by comminuting recycled material.

6. The method according to claim 1, further comprising the acts of:
    impregnating the long fiber layers with a binder; and
    pressing, in a mold, a layer stack formed by the long fiber layers in each case comprising interposed short fibers.

7. The method according to claim 1, wherein the short fibers and/or the long fiber layers are produced substantially from carbon.

8. The method according to claim 1, wherein the long fiber layers are unidirectional long fiber layers.

9. A method for producing a fiber composite component from at least two long fiber layers, wherein the method comprises the acts of:
    a) providing a long fiber layer;
    b) discharging short fibers from a device to apply the short fibers to the long fiber layer such that the short fibers at least partially penetrate into the long fiber layer; and
    c) applying a further long fiber layer to the long fiber layer provided with the short fibers,
    wherein the short fibers are designed and dimensioned such that, and are applied in such a manner that, a propagation of cracks in one of the long fiber layers into the respective other of the long fiber layers and/or a delamination between the long fiber layers is rendered more difficult, and
    wherein the acts b) and c) are alternately carried out multiple times.

10. The method according to claim 9, wherein the further long fiber layer in act c) is applied such that the short fibers at least partially penetrate into the further long fiber layer.

11. A method for producing a fiber composite component from at least two long fiber layers, wherein the method comprises the acts of:
    a) providing a long fiber layer;
    b) discharging short fibers from a device to apply the short fibers to the long fiber layer such that the short fibers at least partially penetrate into the long fiber layer; and
    c) applying a further long fiber layer to the long fiber layer provided with the short fibers,
    wherein the short fibers are designed and dimensioned such that, and are applied in such a manner that, a propagation of cracks in one of the long fiber layers into the respective other of the long fiber layers and/or a delamination between the long fiber layers is rendered more difficult, and
    wherein the short fibers are impregnated with a binder before being applied to the long fiber layer.

12. A method for producing a fiber composite component from at least two long fiber layers, wherein the method comprises the acts of:
    a) providing a long fiber layer;
    b) discharging short fibers from a device to apply the short fibers to the long fiber layer such that the short fibers at least partially penetrate into the long fiber layer; and
    c) applying a further long fiber layer to the long fiber layer provided with the short fibers,
    wherein the short fibers are designed and dimensioned such that, and are applied in such a manner that, a propagation of cracks in one of the long fiber layers into the respective other of the long fiber layers and/or a delamination between the long fiber layers is rendered more difficult, and
    wherein the short fibers are produced from a same material as the long fiber layers.

* * * * *